A. G. WOOD, Jr.
WATER CLOSET BOWL.
APPLICATION FILED JAN. 8, 1918.

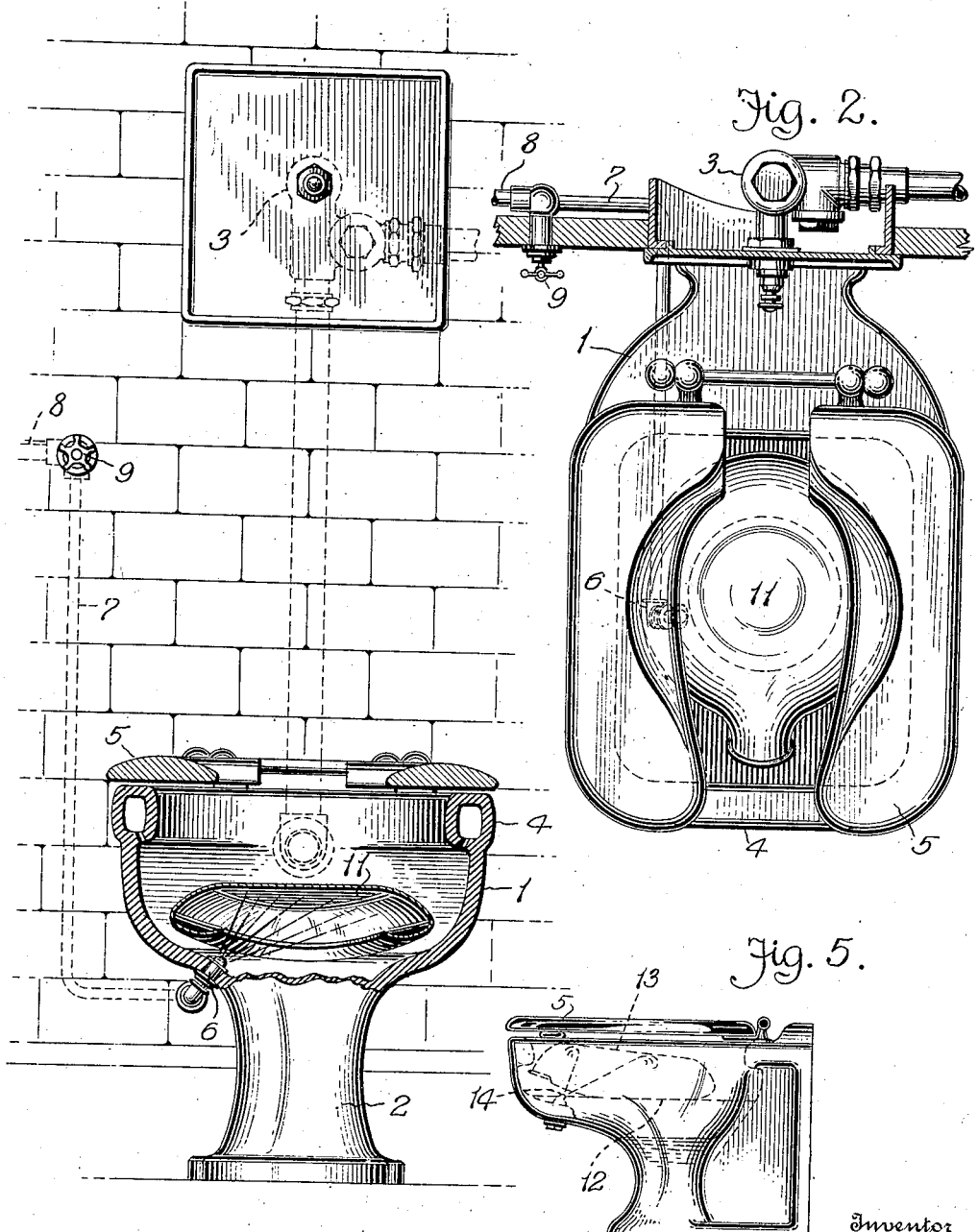

1,376,907.

Patented May 3, 1921.
2 SHEETS—SHEET 2.

Witness
Chas. W. Stauffiger
Karl H. Butler

Inventor
Albert G. Wood Jr.
By
Attorneys

UNITED STATES PATENT OFFICE.

ALBERT G. WOOD, JR., OF DETROIT, MICHIGAN, ASSIGNOR TO HENRY FORD HOSPITAL, OF DETROIT, MICHIGAN, A CORPORATION OF MICHIGAN.

WATER-CLOSET BOWL.

1,376,907.  Specification of Letters Patent.  Patented May 3, 1921.

Application filed January 8, 1918. Serial No. 210,824.

*To all whom it may concern:*

Be it known that I, ALBERT G. WOOD, Jr., a citizen of the United States of America, residing at Detroit, in the county of Wayne and State of Michigan, have invented certain new and useful Improvements in Water-Closet Bowls, of which the following is a specification, reference being had therein to the accompanying drawings.

In hospitals, sanatoriums or other institutions where bedpans are used, it is a task to clean and maintain the bedpans in a sanitary condition and to provide means whereby such pans may be easily, quickly and thoroughly cleansed is the main object of this invention, which is attained by furnishing a water closet bowl or hopper with means for discharging water into a bedpan inverted in the bowl or hopper. Besides providing the water closet bowl or hopper with a jet for such purposes, I have designed the bowl or hopper so that it may be used as a slop sink, thereby practically combining three articles namely, the closet bowl, slop sink, and bed pan cleaning device.

The closet bowl or hopper may be of the siphon, trap or direct flush type supplied with water when occasion demands, and the top of the bowl or hopper is provided with a hinged or detachable seat so that it may be used in the usual manner. The top of the bowl or hopper is shaped similar to a basin or a sink so that it may be used when the seat is lifted or detached. As a bed pan cleaning device the bowl or hopper has a jet or nozzle in communication with a suitable supply of water, preferably under pressure, and the jet is positioned to discharge water into an inverted bedpan placed in the bowl or sink, which is also designed to have side or end ledges for supporting the bedpan in proper position to be cleaned.

My invention will be hereinafter described and then claimed, and reference will now be had to the drawings, wherein—

Figure 1 is a vertical cross sectional view of a combined closet bowl, slop sink, and bed pan cleaning device;

Fig. 2 is a plan of the same;

Fig. 5 is a side elevation of the closet bowl on a small scale, illustrating a further modification of my invention.

Figure 3:
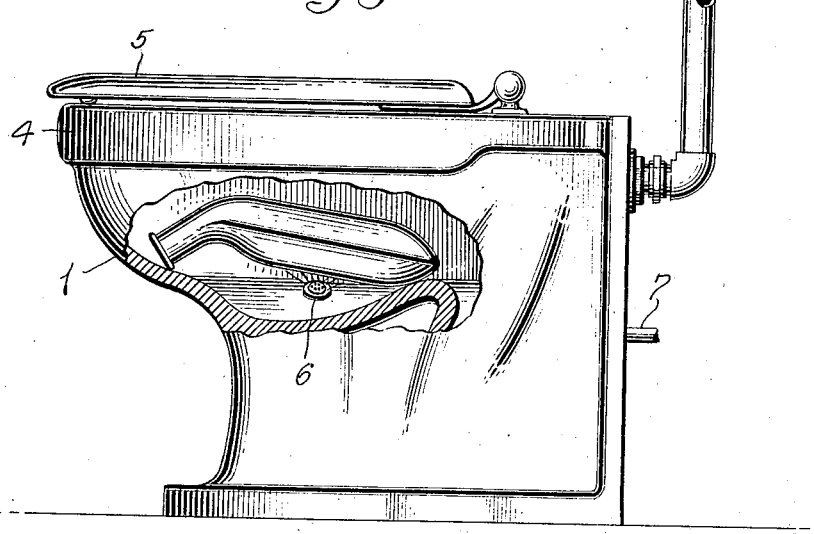
Fig. 3 is a side elevation of a closet bowl, partly broken away and partly in section, showing the position of the bed pan therein.

In the drawing, the reference numeral 1 denotes a water closet bowl or hopper having a pedestal or base portion 2. This bowl or hopper may be of the siphon, trap or direct outlet type having a suitable flushing mechanism or apparatus, generally designated 3, which will supply and properly distribute water in the bowl to thoroughly cleanse and flush the same. The top or rim 4 of the bowl or hopper is preferably hollow in order that water may be distributed in the bowl and on the side walls thereof, and said rim is substantially rectangular in plan, thus imparting to the top of the bowl the usual outline of a basin or sink.

Connected to the top of the bowl or hopper is a seat or lid 5 which may be bodily removable or hinged so that it may be raised when it is desired to use the bowl or hopper for other purposes than with a seat or lid.

Figure 4:
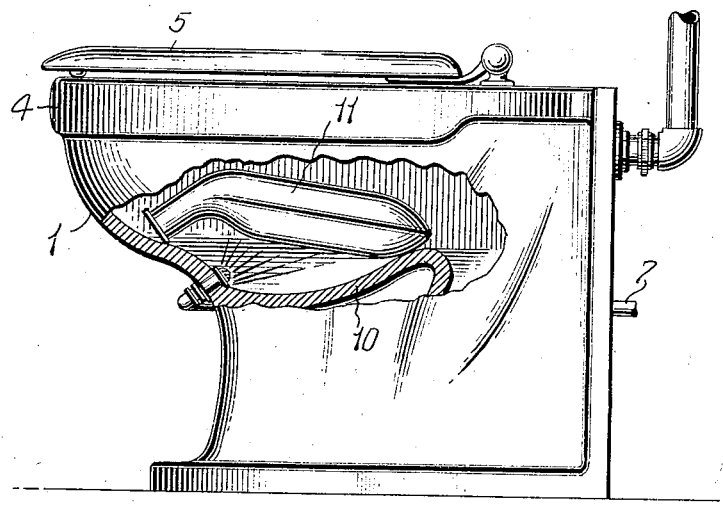
Fig. 4 is a similar view of a slight modification of my invention.

Extending through the wall of the bowl or hopper 1 is a jet or nozzle 6 connected by a pipe 7 to a suitable water supply pipe 8, and a conventional form of valve 9 controls the supply of water to the jet or nozzle 6. The jet or nozzle 6 may be in the side, front or bottom of the bowl or hopper, according to the type of the same, and as shown in Figs. 1 to 4 inclusive, the bowl or hopper is of the siphon type and consequently the bottom or basin 10 thereof will afford a support for a bed pan 11, which may be inverted and placed in the bowl or hopper so that water discharged from the jet or nozzle will enter the bed pan and thoroughly flush and cleanse the same, as best shown in Fig. 1, the bowl contents passing into the normal liquid content of the bowl. It is also obvious that the exterior walls of the bed pan will be thoroughly cleansed by water supplied to the bowl or hopper for flushing purposes.

In Fig. 5 of the drawing, there is illustrated a slight modification of my invention, showing what may be termed a direct outlet bowl or hopper, and with this form, the walls of the bowl or hopper have a ledge or shoulder 12 on which an inverted bed pan 13 may be placed and supported.

The jet or nozzle which is adapted to discharge water into the inverted bed pan is designated 14 and it will be noted that the same is located above the normal level of water within the hopper or bowl, this arrangement differing from the first mentioned form in so much that the jet or nozzle 6 may be in a small body of water normally maintained within the bottom or basin of the hopper. In either instance, the jet or nozzle is adapted to direct sprays of water or other liquid into the bed pan and reach all the surface thereof so that the contents of the pan may be quickly removed. When hot water is used in a hospital, it is unnecessary to manually wipe or dry the bed pan thus saving a nurse considerable labor.

Another feature of the invention is that of using the bed pan cleaning jet as an inlet for sterilizing liquid which may be admitted to the bowl independent of the water generally used to flush the bowl.

As will be understood, the general arrangement herein disclosed has the effect of rendering the ordinary water-closet system applicable for use as a slop sink for the cleansing of the bed pans and without the liability of providing for spread of contagion. The bed pan is supported by the bowl below the level of the seat and in such relation that the contents of the bowl are kept from being splashed either on to the seat, out of the bowl on to the floor, or on to the hands or clothing of the attendant handling the bed pan, inverting of the pan having the effect of causing the discharging contents to pass only into the normal liquid content of the bowl so that flushing of the bowl after removal and cleansing of the pan, carries the contaminating contents out through the usual outlet of the hopper.

While in the drawings there are illustrated the preferred embodiments of my invention, it is to be understood that the structural elements are susceptible to such variations and modifications as fall within the scope of the appended claims.

What I claim is:

1. As a means for rendering a water closet hopper available for the cleansing of bed pans or like utensils, a hopper adapted for normal water closet operation and having a configuration to locate the utensil in position to discharge its contents within the normal liquid content of the hopper, and controllable means adapted to produce a water supply under pressure to the interior of the utensil so located to permit utensil cleansing with the drainage discharging into such hopper content.

2. As a means for rendering a water closet hopper available for the cleansing of bed pans or like utensils, a hopper adapted for normal water closet operation and having an internal configuration to locate the utensil in position to discharge its contents within the normal liquid content of the hopper, and controllable means adapted to produce a water supply under pressure to the interior of the utensil so located to permit utensil cleansing with the drainage discharging into such hopper content.

3. As a means for rendering a water closet hopper available for the cleansing of bed pans or like utensils, a hopper adapted for normal water closet operation and having an internal configuration to locate the utensil in position to discharge its contents within the normal liquid content of the hopper, and controllable means adapted to produce a water supply under pressure and independent of the normal hopper supply, said means being positioned relative to the located utensil to cause the water supply to enter the interior of the utensil to permit utensil cleansing with the drainage discharging into such hopper content.

4. As a means for rendering a water closet hopper available for the cleansing of bed pans or like utensils, a hopper adapted for normal water closet operation and having an internal seat configuration to locate the utensil in position to discharge its contents within the normal liquid content of the hopper, and controllable means adapted to produce a water supply under pressure to the utensil so located to permit utensil cleansing with the drainage discharging into such hopper content.

In testimony whereof I affix my signature in the presence of two witnesses.

ALBERT G. WOOD, Jr.

Witnesses:
GEO. W. WALLSTROM,
HARRY C. VICARY.